US006488329B1

United States Patent
Smith

(10) Patent No.: US 6,488,329 B1
(45) Date of Patent: Dec. 3, 2002

(54) FLATBED TOP

(76) Inventor: Duane M. Smith, 17795 22nd St., Mayer, MN (US) 55360

( * ) Notice: Subject to any disclaimer, the term of this patent is extended or adjusted under 35 U.S.C. 154(b) by 0 days.

(21) Appl. No.: 09/658,100

(22) Filed: Sep. 8, 2000

(51) Int. Cl.$^7$ .................................................. B60P 7/02
(52) U.S. Cl. ............................ 296/100.07; 296/100.01
(58) Field of Search ..................... 296/100.07, 100.06, 296/100.08, 100.02, 100.17, 100.18, 100.12, 100, 110, 159

(56) References Cited

U.S. PATENT DOCUMENTS

| | | | |
|---|---|---|---|
| 2,806,477 A | 9/1957 | Fritsche | |
| 3,465,765 A | 9/1969 | Dietz | |
| 3,700,124 A | * 10/1972 | Lawrence | 296/58 |
| 3,721,467 A | * 3/1973 | Kerr | 296/28 |
| 3,773,379 A | * 11/1973 | Loiseau | 296/100 |
| 3,901,548 A | * 8/1975 | Seaman | 296/100 |
| 4,402,544 A | * 9/1983 | Artim et al. | 296/110 |
| 4,657,299 A | * 4/1987 | Mahan | 296/159 |
| 4,709,956 A | * 12/1987 | Bowman | 296/100 |
| 4,902,064 A | 2/1990 | Tuerk et al. | |
| 4,964,669 A | * 10/1990 | Geier | 296/100 |
| 5,007,672 A | * 4/1991 | Koch | 296/100 |
| 5,186,513 A | * 2/1993 | Strother | 296/100 |
| 5,190,341 A | * 3/1993 | Simard | 296/100 |
| 5,238,288 A | * 8/1993 | Chandler | 296/100 |
| 5,338,084 A | 8/1994 | Wardell | |
| 5,340,188 A | * 8/1994 | Goble | 296/100 |
| 5,641,192 A | * 6/1997 | Smith et al. | 296/100 |
| 5,681,074 A | * 10/1997 | Christensen | 296/100 |
| 5,752,736 A | * 5/1998 | Nodier | 296/100 |
| D406,800 S | 3/1999 | Nece | |
| 5,951,092 A | * 9/1999 | Cissel | 296/100.12 |
| 6,186,580 B1 | * 2/2001 | Nothem et al. | 296/100.08 |

FOREIGN PATENT DOCUMENTS

| | | |
|---|---|---|
| DE | 848859 | 9/1952 |
| JP | 0067418 | 3/1989 |

* cited by examiner

*Primary Examiner*—Kiran Patel
(74) *Attorney, Agent, or Firm*—Gerald E. Helget; Nelson R. Capes; Briggs and Morgan

(57) ABSTRACT

An aerodynamic, lightweight, flexible material flatbed top for enclosing a flatbed of a wheeled vehicle. The horizontal frame structure of front and side rails may be expansible. Inverted U-shaped cover support poles run front to rear and are mounted in the rectangular horizontal frame. A flexible material is stretched or draped over the support poles and secured to the frame structure. Cooperating locking and pivoting pin assemblies for each corner of the trailer top cooperate with corner brackets located at the deck corners of the flatbed to secure the top to the flatbed and to permit alternating rotation about an axis located at the front of the top or an axis located at the rear of the top to gain access into the space covered by the top on the flatbed.

7 Claims, 4 Drawing Sheets

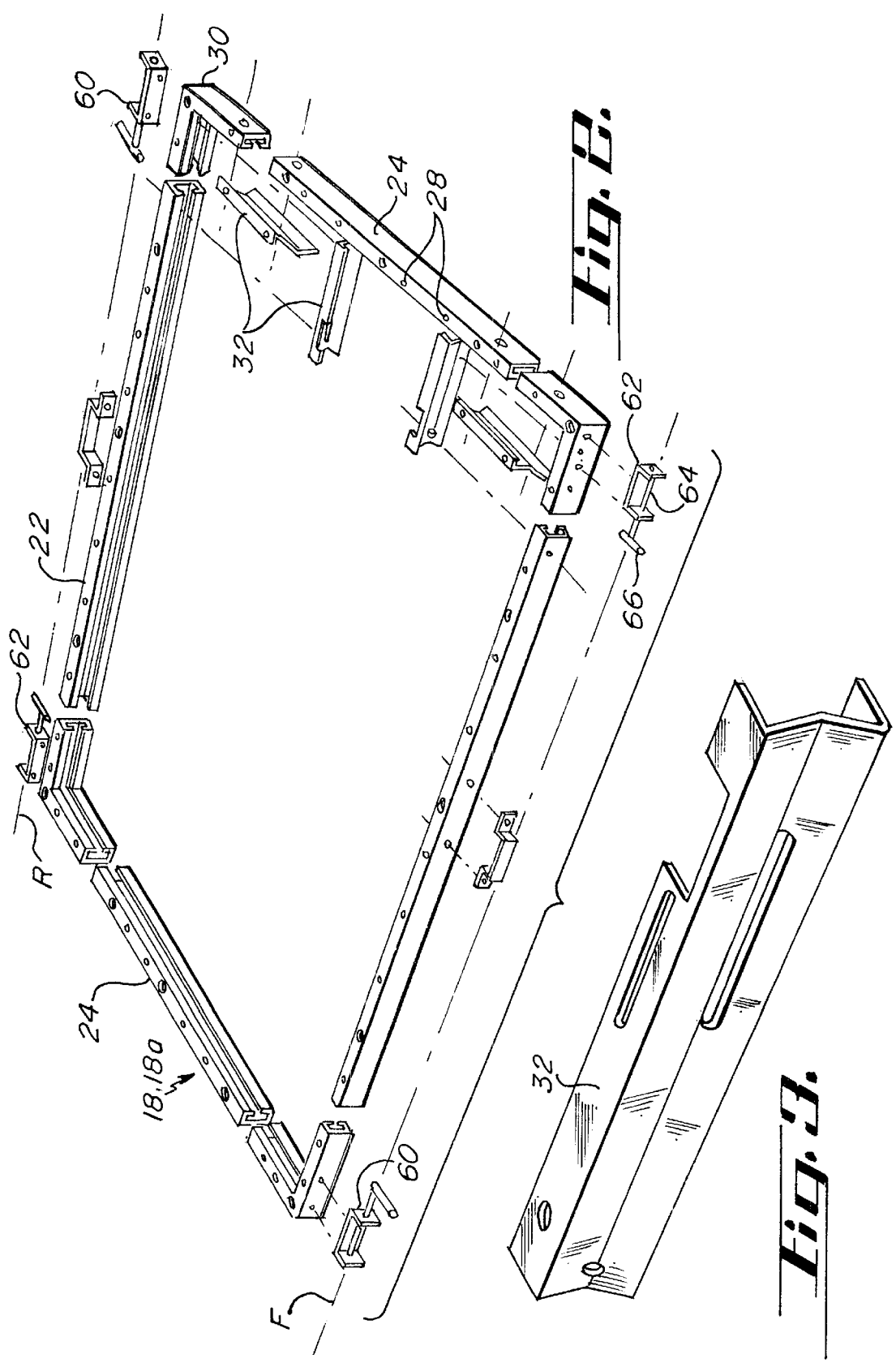

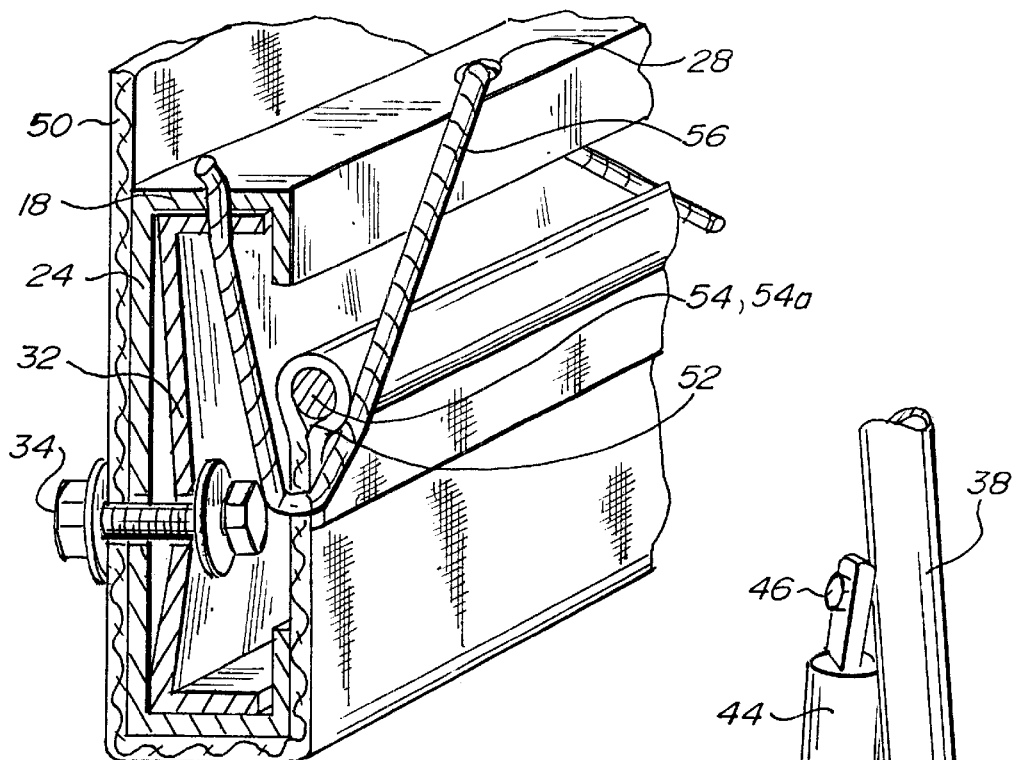
Fig. 6.
Fig. 5.
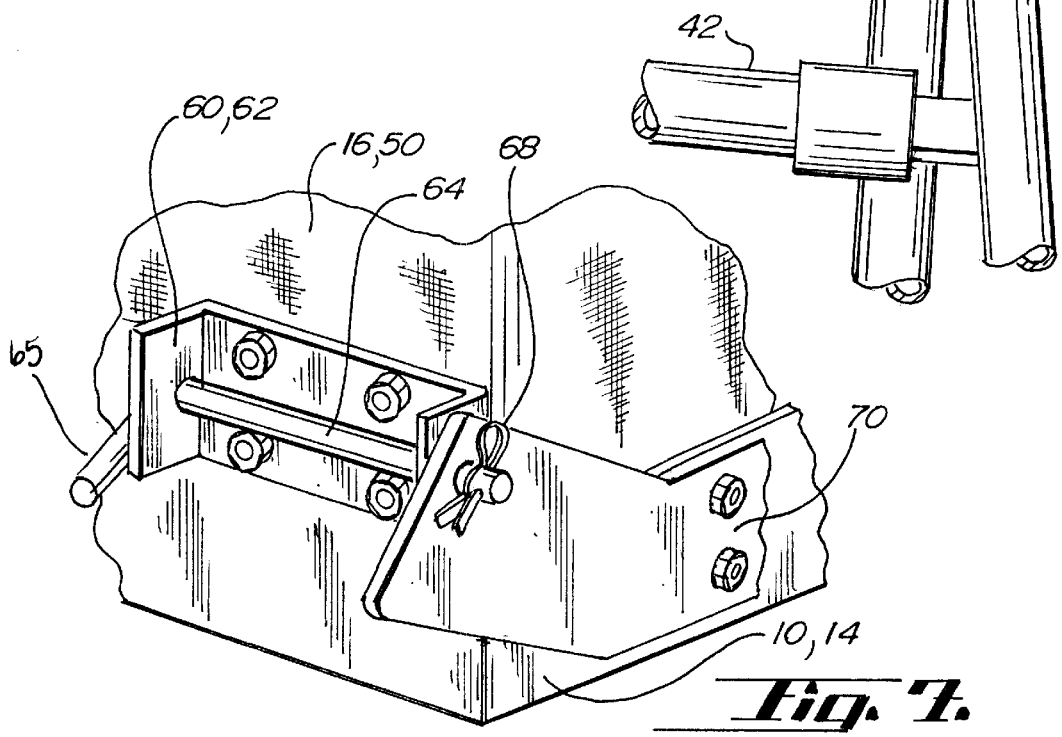
Fig. 7.

FLATBED TOP

BACKGROUND OF THE INVENTION

The present invention relates to tops for flatbeds of wheeled vehicles, such as trucks or trailers, and more particularly to a quick-release removable flatbed top that is aerodynamical, lightweight, and capable of being pivotally opened about a rotational axis forwardly or rearwardly of the top.

Flatbeds are common in vehicles. Generally the flatbed of a trailer or motorized vehicle includes a horizontal surface or deck without walls or a ceiling. The advantage of flatbeds is that they permit the transport of any of a variety of structures or devices without concern for adequate side or vertical space because walls and ceilings are generally nonexistent on a flatbed.

Another significant advantage of flatbeds is that they are relatively lightweight with the absence of a ceiling and sidewalls which otherwise make for heavy rigid structures. Furthermore, with the absence of sidewalls and ceilings, flatbeds are relatively economical to purchase and more economical to transport without the significant and weighty sidewalls and ceiling.

There is a need for an aerodynamic, lightweight trailer top for enclosing flatbeds that quickly fastens onto a flatbed and is capable of opening by upward pivotal rotation either from the front or the rear of the flatbed along a front or rear axis.

SUMMARY OF THE INVENTION

An aerodynamic, lightweight, flexible material flatbed top for enclosing a flatbed of a wheeled vehicle. The horizontal frame structure of front and side rails may be expansible. Inverted U-shaped cover support poles run front to rear and are mounted in the rectangular horizontal frame. A flexible material is stretched or draped over the support poles and secured to the frame structure. Cooperating locking and pivoting pin assemblies for each corner of the trailer top cooperate with corner brackets located at the deck corners of the flatbed to secure the top to the flatbed and to permit alternating rotation about an axis located at the front of the top or an axis located at the rear of the top to gain access into the space covered by the top on the flatbed.

The principal object and advantage of the present invention is that the flatbed top supported by its frame has cooperating locking and pivoting pin and bracket assemblies with the trailer decking which permit the flatbed top to be easily removed or secured upon the deck of a flatbed.

Another object and advantage of the present invention is that the locking pivot pin assemblies and brackets permit the opening of the flatbed top from either the front or the rear as the top rotates either along a rear or front pivoting axis.

Another object and advantage of the present invention is that the trailer top is significantly lightweight, between 100 to 150 pounds, for a trailer that is less than fourteen feet long. Thus the trailer top does not significantly add to the towing weight of the trailer or overall gross vehicle weight of the motorized vehicle.

Another object and advantage of the present invention is that the top is relatively inexpensive when compared to a trailer or wheeled vehicle having fixed sidewalls and ceiling.

Other objects and advantages will become readily apparent upon review of the following figures, specification and appended claims.

BRIEF DESCRIPTION OF THE DRAWINGS

FIG. 2 is a perspective plan view showing the parts of the rectangular frame in exploded arrangement.

FIG. 3 is a perspective view of one of the expansion joints.

FIG. 5 is an enlarged and broken away view of the support poles secured together by fastener caps.

FIG. 6 is an enlarged sectional view through a completed frame rail.

FIG. 7 is a broken away perspective view of the locking and pivoting pin assembly.

DETAILED SPECIFICATION

Figure 4:
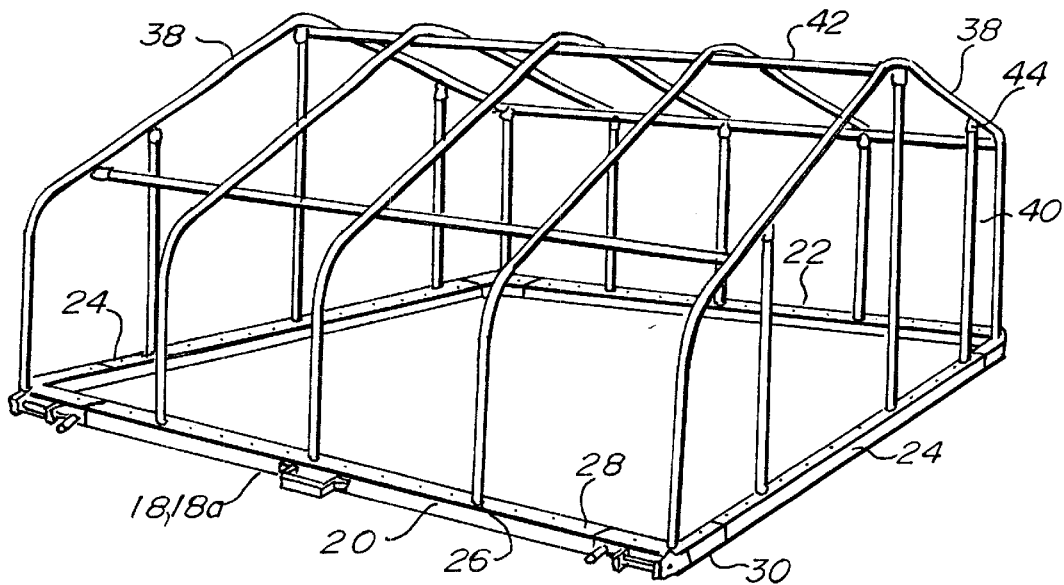
FIG. 4 is a perspective view of the U-shaped poll and support structure mounted onto the frame.
Figure 1:
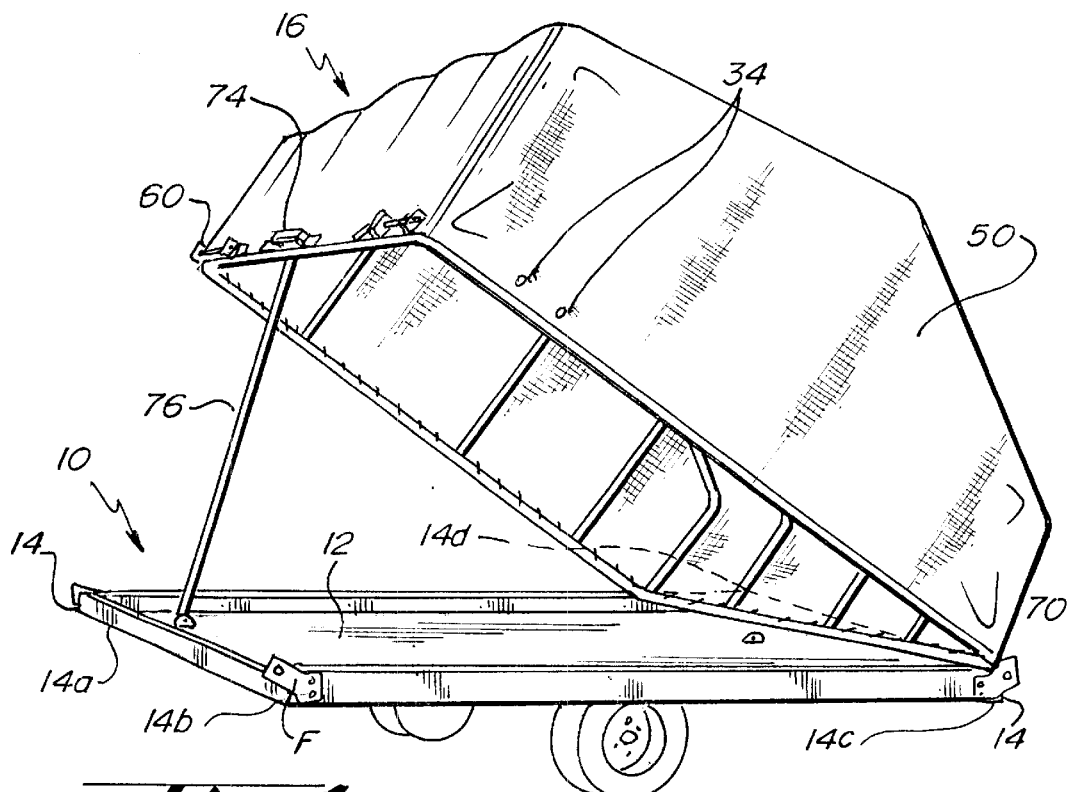
FIG. 1 is a perspective view of a flatbed trailer supporting the flatbed top in its forwardly open position.
Figure 8:
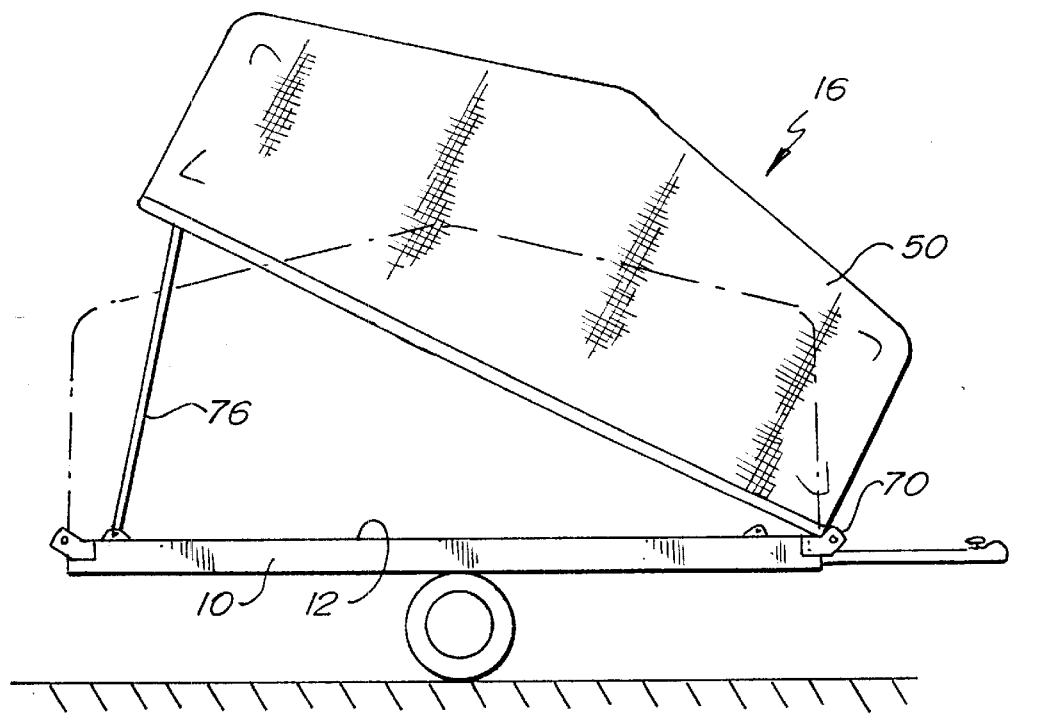
FIG. 8 is a side elevational view showing the trailer top opened from the rear and rotated upon the front axis of the pin assembly.
Figure 9:
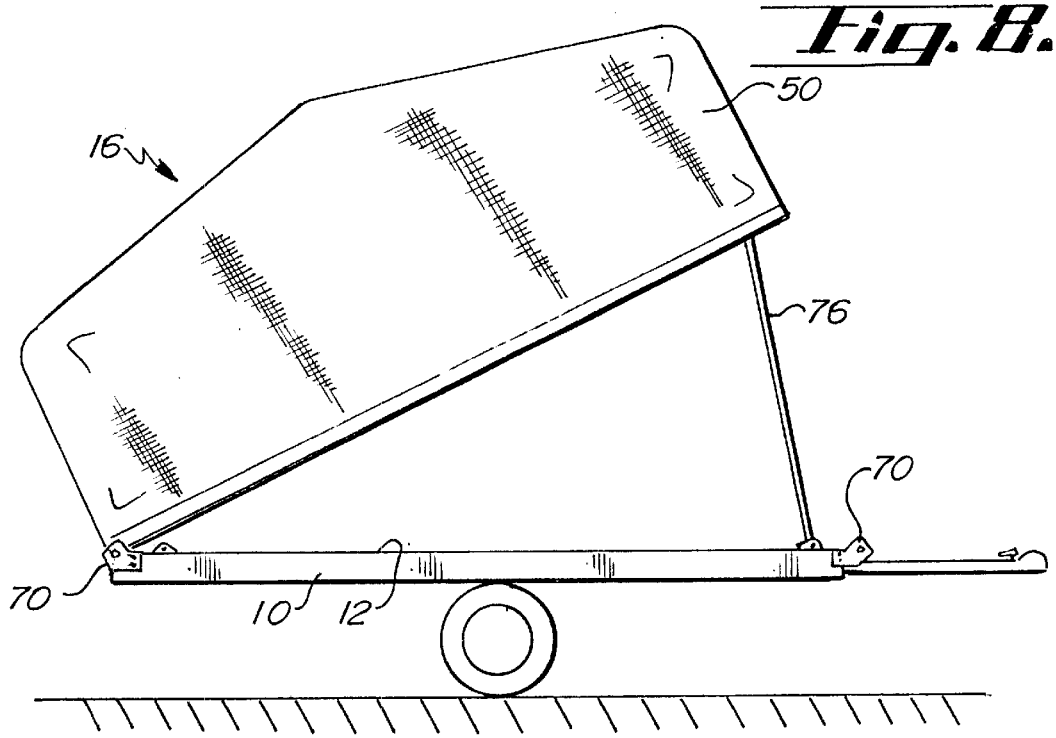
FIG. 9 is a side elevational view showing the trailer top opened from the front and rotating upon the rear pin assembly.

Referring to FIG. 1, a flatbed trailer or vehicle 10 may be seen. The flatbed 10 may also be a self-propelled or motorized vehicle. The trailer 10 includes a flatbed or deck 12 which is transportable by wheels being supported from underneath suitably by axles as is well known. The flatbed 10 has four corners 14, 14a, 14b, 14c, 14d.

Referring to FIGS. 1–5, the aerodynamic, lightweight, flexible material trailer top 16 of the present invention may be generally understood. The frame 18 is formed from front rails 20 and back rails 22 along with side rails 24. The rails include top apertures 26 for poles and top apertures 28 for a securing cord 56. The rails 20, 22, and 24 are generally connectable by corners 30.

As can be appreciated, expansion joints 32 may be used between the rails 20, 22, and 24 and top corners 30. Expansion joints 32 simply telescope into corners 30 and rails 22. Nuts and bolts 34 are then secured through the rails and expansion joints 32 until back wall of the expansion joint 32 straightens and secures the corner sturdy to rails 20, 22, and 24 with nuts and bolts 34.

After the rectangular horizontal frame 18a is laid out and the pieces positioned together, and U-shaped cover support poles 38 are put in place in pole apertures 26. Vertical support poles 40 are similarly put in pole apertures 26 in side rails 24 to further support the end U-shaped cover support poles 38. Lateral support poles 42 are then strung across the upper portions of U-shaped cover support poles 38 and secured in place by fastener caps 44 with screws 46.

The flexible material is draped or stretched over the U-shaped cover support poles 38 and wrapped around and under the frame 18 as can be appreciated in FIGS. 1, 6, 7, 8, and 9. The flexible material 50 has a bottom sleeve 52, which suitably captures a wire 54 or other flexibly strong member, 54a. Cord 56 is then wrapped around the wire 54 contained by the sleeve and is threaded along the cord apertures 28 back through the bottom sleeve, 52 securely pulling the flexible material 50 down around and adjacent inside of frame 18 as can be seen.

Locking and pin assemblies 60 are located at each flatbed corner 14 and top corner 30. The pin assembly 60 includes frame brackets 62 which are secured on the outside of flexible material 50 with nuts and bolts 34. The pin assembly includes pin 64 with handle 66 supported by a frame bracket 62. A cotter or locking pin 68 may secure the pin in a locked position as it passes through the deck corner bracket 70 which is similarly secured to the flatbed deck 12. When the four pins 64 are secured into the four deck corner brackets 70 flatbed top 16 is secured to the flatbed trailer 10.

With removal of the front pins 64, the flatbed top is permitted to pivot or rotate upwardly to gain access to the flatbed trailer 10 as the flatbed top 16 rotates on axis R through the rear locking or pivoting pin assemblies. Alternatively, with the rear pins 64 removed and the front pins in place, the flatbed top 16 may rotate to an open upward position for access to the flatbed trailer as the flatbed top 16 rotates along the front axis F. This description is clearly shown in FIGS. 8 and 9. Handle 74 may be added to the outside of the frame 18 to assist in the lifting of the flatbed top 16. Poles 76 may be removably secured to the flatbed deck 12 and inside of the frame 18 to permit supporting the flatbed top 16 in its opened position.

The present invention may be embodied in other specific forms without departing from the spirit or essential attributes thereof. Therefore, the illustrated embodiment should be considered in all respects as illustrative and not restrictive. Reference is made to the appended claims rather than to the foregoing description to indicate the scope of the invention.

What is claimed:

1. A pivotally openable cover for a wheeled flatbed with a deck and four deck corners, comprising:
    (a) a horizontal frame with frame corners placeable on top of the decks, and rails between the frame corners;
    (b) inverted U-shaped cover support poles mounted on the frame,
    (c) a flexible material mounted over the poles and secured to the frame;
    (d) deck brackets adapted to be secured adjacent each deck corner,
    (e) frame brackets secured adjacent to each frame corner adjacent to one of the deck brackets;
    (f) a locking and pivoting pin for each pair of deck and frame brackets permitting attachment and removal of the cover to and from the flatbed deck and permitting pivotal upward opening of the top with rotation along either a front axis or rear axis; and
    (g) further comprising expansion joints between the rails and frame corners.

2. The cover of claim 1, wherein the support poles run from front to rear of the frame.

3. The cover of claim 1, further comprising lateral support poles connecting the corner support poles.

4. The cover of claim 1, wherein the material has a bottom sleeve carrying a flexible member wrapping under and around the frame having the flexible member secured to the frame.

5. A pivotally openable cover for a wheeled flatbed with a deck and four corners, comprising:
    (a) a horizontal rectangular frame with frame corners placeable on top of the deck, and rails between the frame corners;
    (b) inverted U-shaped cover support poles mounted on the frame running front to rear of the frame;
    (c) a flexible material mounted over the poles and secured to the frame;
    (d) deck brackets adapted to be secured adjacent each deck corner,
    (e) frame brackets secured adjacent to each frame corner adjacent to one of the deck brackets;
    (f) a locking and pivoting pin for each pair of deck and frame brackets permitting attachment and removal of the cover to and from the flatbed deck and permitting pivotal upward opening of the top with rotation along either a front axis or rear axis; and
    (g) further comprising expansion joints between the rails and frame corners.

6. The cover of claim 5, further comprising of lateral support poles connecting the cover support poles.

7. The cover of claim 5, wherein the material has a bottom sleeve carrying a flexible member wrapping under and around the frame having the flexible member secured to the frame.

\* \* \* \* \*